United States Patent [19]

Rein et al.

[11] Patent Number: 5,394,934
[45] Date of Patent: Mar. 7, 1995

[54] INDOOR AIR QUALITY SENSOR AND METHOD

[75] Inventors: Alan D. Rein; John C. Olson, both of Shoreview, Minn.; Philipp A. Bachmann; Urs F. Bogli, both of Zurich, Switzerland

[73] Assignee: American Standard Inc., Piscataway, N.J.

[21] Appl. No.: 228,235

[22] Filed: Apr. 15, 1994

[51] Int. Cl.⁶ .............................. F25B 29/00
[52] U.S. Cl. .................... 165/16; 73/23.21; 236/49.3; 454/256
[58] Field of Search .......... 165/16; 236/49.3; 454/256, 258; 73/23.21, 31.02, 31.03, 1 G

[56] References Cited

U.S. PATENT DOCUMENTS

| | | | |
|---|---|---|---|
| 4,164,172 | 8/1979 | Anderten et al. | 98/33 |
| 4,257,319 | 3/1981 | Kucharczyk | 454/256 |
| 4,322,383 | 3/1982 | Yasuda et al. | 73/23.21 X |
| 4,379,402 | 4/1983 | Harman, III | 73/23.21 |
| 4,419,211 | 12/1983 | Brauer | 73/23.21 X |
| 4,458,583 | 7/1984 | Fukui et al. | 98/2 |
| 4,462,246 | 7/1984 | Advani et al. | 73/23.21 |
| 4,478,048 | 10/1984 | Dills | 62/126 |
| 4,509,359 | 4/1985 | Gedeon et al. | 73/1 G X |
| 4,557,603 | 12/1985 | Oehler et al. | 356/418 |
| 4,567,939 | 2/1986 | Dumbeck | 165/16 |
| 4,578,762 | 3/1986 | Wong | 364/497 |
| 4,657,397 | 4/1987 | Oehler et al. | 356/414 |
| 4,694,173 | 9/1987 | Wong | 250/343 |
| 4,740,086 | 4/1988 | Oehler et al. | 356/432 |
| 4,756,622 | 7/1988 | Wong | 356/437 |
| 4,795,240 | 1/1989 | Wong et al. | 350/353 |
| 4,910,463 | 3/1990 | Williams, II et al. | 324/468 |
| 5,026,992 | 6/1991 | Wong | 250/343 |
| 5,033,284 | 7/1991 | Belt et al. | 73/23.21 X |
| 5,047,639 | 9/1991 | Wong | 250/341 |
| 5,060,508 | 10/1991 | Wong | 73/31 |
| 5,074,137 | 12/1991 | Harris et al. | 73/31.02 |
| 5,079,422 | 1/1992 | Wong | 250/343 |
| 5,088,314 | 2/1992 | Takashi | 73/31.02 X |
| 5,103,096 | 4/1992 | Wong | 250/343 |
| 5,153,822 | 10/1992 | Yabazaki et al. | 364/140 |
| 5,163,332 | 11/1992 | Wong | 73/863 |
| 5,177,696 | 1/1993 | Bonne | 364/557 |
| 5,261,596 | 11/1993 | Tachibana et al. | 236/49.3 |
| 5,267,897 | 12/1993 | Drees | 454/229 |

OTHER PUBLICATIONS

David Bearg, P.E., "Demand-Controlled Ventilation", *Air Conditioning, Heating & Refrigeration News* (ACH&R News), Oct. 14, 1991, pp. 12-14.
David Bearg, P.E., "IAQ Tools & Techniques", *ACH&R News*, May 18, 1992, pp. 14–16.
1991 *ASHRAE Handbook*, "Control of Gaseous Contaminants for Indoor Air".
Greystone Energy Systems, "Air Quality Monitor".
Honeywell Advertisement, Circle 15.
Honeywell Inc., ACH&R News, Feb. 1, 1993.
ACH&R News, Jun. 14, 1992.
ACH&R News, Oct. 12, 1992.
Popular Science, Dec. 1992.

*Primary Examiner*—William E. Tapolcai
*Attorney, Agent, or Firm*—William J. Beres; William O'Driscoll; Peter D. Ferguson

[57] ABSTRACT

An indoor air quality sensor designed to be utilized in a zone of a building to control the ventilation of the zone and the method of effecting such control. The sensor comprises a first sensor for sensing a selected leading indicator of contamination in the zone and providing an output signal representative thereof and at least one additional sensor for sensing at least one selected secondary indicator of contamination in the zone and providing an output signal representative thereof. A processor, utilized for generating an output signal representative of the indoor air quality in the zone, receives the output signals from the first sensor and the least one additional sensor and generates the output signal representative of the indoor air quality in the zone by influencing the output of the first sensor by an amount that is a function of the output signal of the least one additional sensor.

30 Claims, 3 Drawing Sheets

| J1 | J2 | OUTPUT METHOD | $CO_2$ OUTPUT | IAQ OUTPUT |
|---|---|---|---|---|
| OFF | OFF | ANALOG OUTPUT | 0-10 VDC EQUAL TO 0-2000 PPM | 0-10 VDC EQUAL TO 0-2000 ($CO_2$ EQUAL UNITS) |
| OFF | ON | BINARY OUTPUT | 10 VDC IF IAQ $\geq$ 800, ELSE 0 VDC | |
| ON | ON | BINARY OUTPUT | 10 VDC IF IAQ $\geq$ 1000, ELSE 0 VDC | |
| ON | OFF | BINARY OUTPUT | 10 VDC IF IAQ $\geq$ 1200, ELSE 0 VDC | |

VOC CONCENTRATION (%)

CO₂ SENSOR VALUES (PPM)

INDOOR AIR QUALITY SENSOR AND METHOD

TECHNICAL FIELD

The present invention relates to an Indoor Air Quality (IAQ) sensor which will measure carbon dioxide ($CO_2$) levels as well as other contaminants in a zone of a building environment. More particularly, it relates to an IAQ sensor that selects a leading indicator of air quality, senses that indicator substance and influences the output of that indicator with the results of one or more sensors of secondary indicators such as Volatile Organic Compounds (VOC), carbon monoxide (CO), temperature, and relative humidity in order to control the ventilation of a building zone.

BACKGROUND OF THE INVENTION

Indoor air quality is becoming an increasingly important issue in today's building environment, particular in commercial office buildings. In order to provide guidance to building and HVAC system designers, the American Society of Heating, Refrigeration and Air Conditioning Engineers (ASHRAE) has specified minimums for ventilation rates and indoor air quality that will be acceptable to human occupants and will avoid adverse health effects. These requirements were published in ASHRAE Standard 62-1989. This standard, entitled "Ventilation Standard for Acceptable Indoor Air Quality", presents a series of general requirements for ventilation systems and two alternative procedures for providing acceptable indoor air quality.

Outside ambient air is brought into the zone to correct for unsatisfactory indoor air quality. Outside air may be either substantially colder than the desired indoor air temperature or may be substantially hotter than the desired indoor air temperature. In either case the heating, ventilation, and air conditioning (HVAC) system that serves the particular zone is going to have to work harder to set the desired temperature in the zone when outside ambient air is brought into the zone in substantial quantities. This results in energy inefficiencies for the building. It is desirable in all cases to minimize the amount of outside air that is brought into the zone consistent with maintaining a satisfactory air quality in the zone.

The first such procedure for controlling indoor air quality in the ASHRAE standard is the Ventilation Rate Procedure and uses ventilation air of specified quality in a fixed quantity for the specific zone to achieve acceptable indoor air quality in the zone. The Indoor Air Quality Procedure, on the other hand, uses sensing of known and specifiable contaminants to control the amount of ventilation in order to achieve acceptable indoor air quality in the zone. In typical circumstances, the ventilation system is designed according to the "Ventilation Rate" or "Prescriptive" method, i.e., provide 30 cubic feet per minute (CFM) per person for N persons where N is the design occupancy level of the zone.

The Ventilation Rate Procedure does not use direct sensing of air quality. Instead, it defines the amount of outside air to be delivered to the space based on the design occupancy level of the zone. This method by itself does not insure acceptable air quality and frequently results in inappropriate higher energy costs, since the procedure requires an assumption of the worst indoor air quality and ventilates to correct for this condition at all times, even when the air quality in the zone is satisfactory.

The "IAQ" or "Performance" procedure allows modulation of the ventilation rate when occupancy falls below the design level. This procedure is to directly measure indoor air quality and control the amount of outside air accordingly. Utilization of the IAQ procedure reduces energy costs for the building by increasing outside air flow only when there is a specific need. The drawback to this approach has been the lack of availability of good, low cost air quality sensors and the fact that designers cannot comply until the building is actually occupied.

It is important to note that, utilizing current equipment, system designers can approach compliance with the Ventilation Rate Procedure but cannot comply with the more energy efficient IAQ Procedure that are specified in Standard 62-1989.

Up to now, two different sensing techniques have been used to determine air quality when attempting to meet the IAQ Procedure standard. The first is $CO_2$ sensing and the second is VOC sensing. Each sensor does an adequate job on its own of sensing the parameter that it is designed to sense, but is inadequate in determining true air quality in the zone. In addition, these sensors have been expensive, bulky, and lack long term stability, requiring frequent calibration.

$CO_2$ concentration alone has, in the past, been utilized to regulate the amount of ventilation that is brought into a particular zone. $CO_2$ is generally seen as an indicator of the occupancy and activity by humans of the zone, since it is the occupants and their activity that generate the $CO_2$. It is desirable to increase ventilation when the concentration of $CO_2$ reaches a certain defined level. Absent other contaminants, the modulation of the ventilation based solely on the concentration of $CO_2$ is a reasonable procedure to ensure an adequate indoor air quality.

$CO_2$ is not, however, the sole indicator of indoor air quality. As previously indicated, such items as the level of VOC's, temperature, and the relative humidity also are indicators of the indoor air quality. Of particular interest at the present is the level of VOC's. Such organic compounds typically escape from the fabric utilized in the furnishings of offices over a period of time. For example, the organic compound formaldehyde frequently contaminates the indoor air as it escapes from newly laid carpet. Organic compounds are also generated during the remodeling of spaces by glues, paints, and stains.

There are sensors that will very accurately sense a great number of individual organic compounds and accurately provide the concentration thereof. At present, such sensors are limited to very expensive laboratory instruments and are not practical for use in individual zones of buildings. Accordingly, the VOC sensing that is practical and cost effective for use in air conditioned zones is in general not very selective with respect to which organic compound is present and additionally does not provide a very accurate indication of the level of concentration. As a result of these limitations, reliance on VOC sensing within the zone as the sole indicator of the indoor air quality is not practicable.

It would be a distinct advantage in the industry to develop a low cost $CO_2$/IAQ sensor that is cost effective enough to be applied on a zone by zone basis. The IAQ sensor must sense contaminants other than $CO_2$ and provide an output that reflects the sensing of those other contaminants. In addition, it must be available in both duct and wall mount versions. For the wall mount version, the size of the sensor must approximate the size of the common thermostat.

Additionally, such a low cost IAQ sensor could be modified to sense secondary indicators other than volatile organic compounds. In greenhouse applications, it is preferable to sense combinations using $CO_2$ as the leading value combined with CO, Hydrocarbons or Ethylene. In fruit storage applications, $CO_2$ may be combined with Ethylene or hydrocarbons. In tunnel applications, $CO_2$ may be combined with CO or hydrocarbons. In pig farm applications, $CO_2$ may be combined with Ammonia, CO or hydrocarbons.

SUMMARY OF INVENTION

The $CO_2$/IAQ sensor of the present invention overcomes the drawbacks associated with direct sensing of air quality in the past. The sensor provides a photo acoustic measurement cell for direct measurement of $CO_2$ levels. The $CO_2$ levels are known in PPM quantities ranging from 0 to 2000 PPM. $CO_2$ has been described as a good "tracer gas" which indicates people and is a surrogate for odors which cannot be sensed directly. However, while accurately measuring $CO_2$, the sensor alone is blind to other contaminants in the zone. To address this, a heated semiconductor device is combined with the $CO_2$ sensor to measure the relative level of other contaminants such as volatile organic compounds (VOC), smoke, carbon monoxide (CO), Formaldehyde, cleaning agents and other contaminants. While the $CO_2$ sensor can determine $CO_2$ levels in the PPM range, the VOC sensor can only determine the relative quantity of these other contaminants. However, by combining the results of both sensing techniques a more meaningful determination of air quality is made. This combined IAQ value is then used to reset the specified ventilation rates until the contaminant levels have been reduced.

The product of the present invention is a low cost sensor which directly measures $CO_2$ levels combined with a VOC sensor to also measure the relative level of other air contaminants. The $CO_2$ levels can be logged to document actual $CO_2$ concentration levels. The combined $CO_2$ and VOC level provides an indication of indoor air quality and will be used to both monitor air quality levels for building owners as well as reset zone ventilation requirements. This allows the building operator to better match energy usage with the actual needs for outside air ventilation.

The sensor measures $CO_2$ levels using a photo-acoustic measurement technique which provides a very cost effective, stable, and accurate indication of $CO_2$ levels. Since the $CO_2$ sensor is not sensitive to other types of contaminants such as smoke, cleaning agents, CO, etc., a VOC sensor is also included, which uses a heated semiconductor technique to measure the relative level of other contaminants and odors. The combined effect of sensing both types of air contaminants yields a much better representation of actual indoor air quality.

Due to recent advances in the down sizing of the $CO_2$ sensor, the entire package is capable of being conveniently packaged on a circuit board that is approximately four inches by two inches. This size is consistent with the need to provide a room mount sensor that, to the occupant, is generally the size and shape of the commonly used thermostat and accordingly, is no more intrusive than the common thermostat.

DETAILED DESCRIPTION OF THE DRAWINGS

Figures 1, 3:
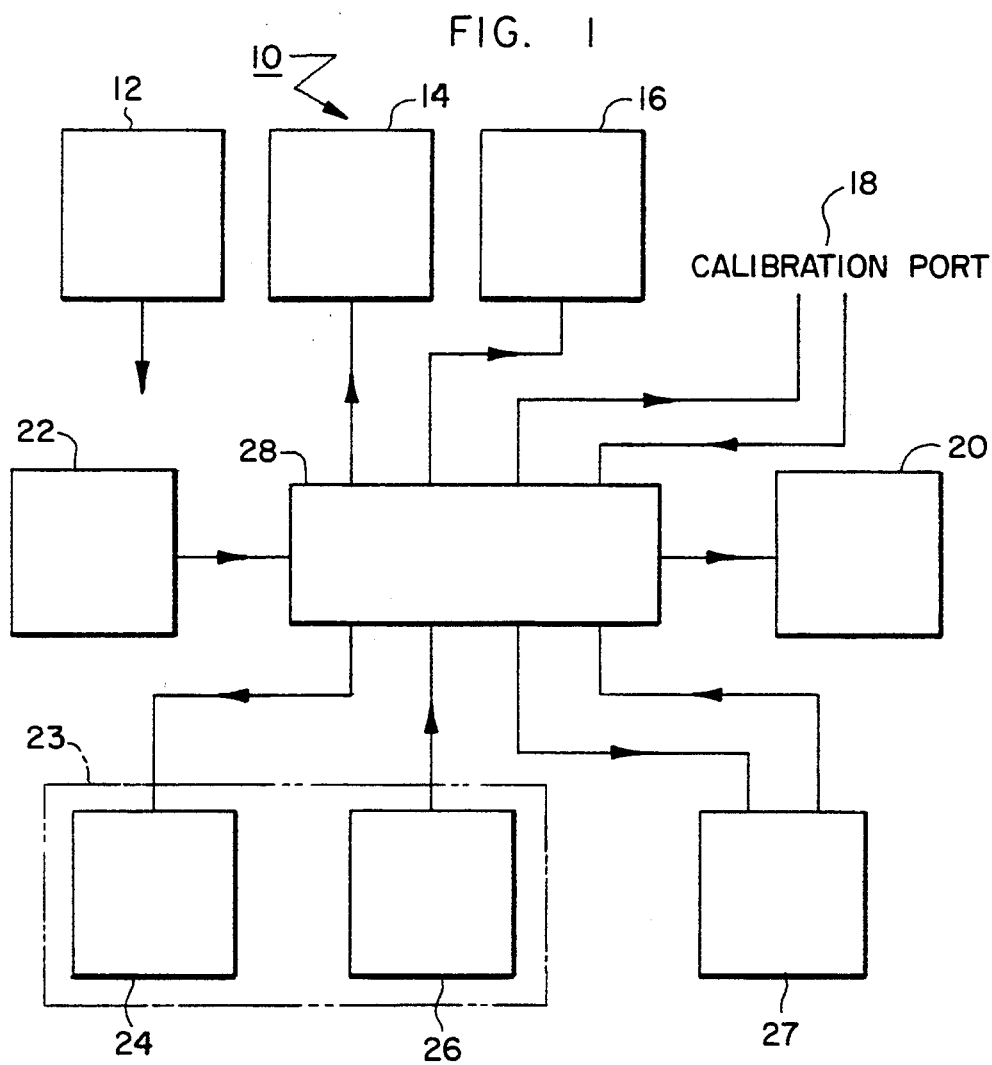
FIG. 1 is a functional block diagram of the present invention.
FIG. 3 is a table showing the effect on the outputs of the present invention as affected by the configuration of the two jumpers.

The present invention involves the reasonable measurement of indoor air quality within certain cost and size constraints. The invention selects a leading indicator of indoor air quality, senses that indicator, and modifies the output of the sensor by buffering it with data derived from a secondary or trailing indicator such as one or more other sensors that are indicative of indoor air quality. A number of such sensors may be used including, carbon dioxide ($CO_2$), volatile organic compounds (VOC), carbon monoxide (CO), temperature, and relative humidity. It is desired to select a leading indicator that is capable of being fairly accurately measured and provides a reasonable indication of indoor air quality. In the instant case, the leading indicator selected is a $CO_2$ sensor. $CO_2$ sensors are known to provide fairly accurate sensing of the actual level of $CO_2$ in a zone. A great deal of data has been generated on what level of $CO_2$ in a zone is acceptable to the occupants. For example, a $CO_2$ concentration in a zone of 1000 parts per million (PPM) is at the high end of the acceptable range of $CO_2$ concentration. With $CO_2$ sensing alone, ventilation is called for when the $CO_2$ concentration within the space exceeds 1000 PPM. $CO_2$ concentration is generally seen as an indication of the level of occupancy and activity in the zone. That is, since the $CO_2$ within the zone is generated by the human occupants of the zone, a determination of the $CO_2$ concentration is an indication of the human occupancy and activity of a zone at any given time.

The present invention utilizes the general, nonselective sensing of the VOC's as a modifier to influence the very selective and accurate $CO_2$ sensing. For example, in the previously indicated data, 1000 PPM of $CO_2$ concentration is an acceptable level. Anything above 1000 PPM of $CO_2$ concentration is cause for increasing the ventilation in the zone. The present invention utilizes an algorithm to take the sensed $CO_2$ level and add to it a nondimensional number that is representative of the sensed VOC level. Accordingly, a particular sensed VOC level may be utilized by the algorithm to add the quantity 200 to the existing sensed $CO_2$ concentration level. The existing $CO_2$ concentration level of 1000 is modified by a non-dimensional indicator of sensed VOC level to provide a non-dimensional level of carbon dioxide equivalence. This non-dimensional value will hereafter be identified as either carbon dioxide equivalence or $CO_{2\ eq}$. The person of skill in the art will recognize that the preferred non-dimensional units of $CO_{2\ eq}$ will vary for other leading indicators.

In the example, with the sensed $CO_2$ level at 1000 PPM the addition of 200 provides an output level of 1200 $CO_{2\ eq}$ units that is utilized to increase the ventilation to the space. In this manner, the VOC level, which is both general and nonselective, is used to influence the use of ventilation in the zone. Other parameters such as temperature and relative humidity can also be used to modify the output of the leading indicator. In such a case, for example, if a $CO_2$ reading of 1000 PPM the system would indicate that such a concentration was acceptable. However, with the sensing of a high relative humidity, an influencing number could be added to the sensed level of $CO_2$ in the zone and thereby influenced the decision as to whether or not to ventilate the zone. In the instance of a high relative humidity, an influencing factor of 300 could be added to the sensed 1000 PPM $CO_2$ concentration to provide an output that would call for additional ventilation for the zone.

In the case of greenhouse, fruit storage, tunnel and pig farm applications, the level of $CO_2$ used to initiate increased ventilation will vary from that used in commercial office buildings. In addition, the amount of influence on the $CO_2$ values from the auxiliary or secondary sensors will also vary. However, within the current invention as subsequently described, these variables can be handled in the software logic to meet the requirements of the specific application.

The present invention also contemplates an IAQ sensor where a leading indicator such as carbon dioxide is modified by several secondary indicators such as a VOC modifier and a temperature modifier. Additionally, in certain applications, it may be advantageous to modify the primary signal with two or more secondary indicators that are the same. For example, VOC sensors may be located at each end of a large space and provide cumulative modifications to the primary signal, thus giving an indirect warning of the extent of contamination.

The invention is discussed in detail as follows.

FIG. 1 illustrates the major functional components of the $CO_2$/IAQ sensor, shown generally at 10. It is desirable that the present invention be compatible with existing HVAC unit controllers so that the present is capable of being retrofitted to such HVAC units. Accordingly, the power input and the outputs of the $CO_2$/IAQ sensor 10 are in a format that is standard within the industry. Field wiring terminations are provided for the 24 VAC power supply 12. A $CO_2$ output terminal 14 is provided having a 0-10 VDC output representing the measured $CO_2$ value. Additionally, an IAQ output terminal 16 provides a 0-10 VDC output representing the calculated IAQ value.

In the preferred embodiment, the calibration port 18 is utilized for factory calibration of the $CO_2$/IAQ sensor 10. The calibration port 18 is not intended for use by the operator of the building but only for use at the factory to initially calibrate the $CO_2$ output 14 and the IAQ output terminal 16. Accordingly, the calibration port 18 does not need to utilize a terminal block connection. Light emitting diodes (LEDs) 20 are provided for visual indication of $CO_2$/IAQ sensor 10 operation and to indicate various IAQ levels. The output method select 22 is provided by selectable jumpers in order that the operator is able to match the output signal of the $CO_2$ output terminal 14 and the IAQ output terminal 16 to the specific requirements of the ventilation control system in the building. Although the preferred embodiment of the calibration port 18 communicates for calibration purposes only, alternative embodiments are contemplated where the calibration port 18 acts as a communicating sensor. When acting as a communicating sensor, all sensor information is communicated through the calibration port 18 in a serial fashion as opposed to discrete analog and binary outputs. This communicating function is a logical extension of the sensor 10 especially if an industry standard communication protocol is utilized. Alternative embodiments also contemplate the replacement of the light emitting diodes 20 with a small liquid crystal display which shows the calculated IAQ values, $CO_2$ values, and $CO_2$ equivalent values in any conventional format. Further alternative embodiments contemplate that the output method select 22 implement push buttons to select the alarming and control setpoint instead of the selectable jumpers contemplated by the preferred embodiment.

The $CO_2$ sensor 23 is formed of two components, the infrared (IR) source 24 and the measurement cell and signal conditioning unit 26. The infrared (IR) source 24 and the measurement cell and signal conditioning unit 26 function cooperatively and are utilized for sensing of the $CO_2$ concentration in the zone that is being monitored by $CO_2$/IAQ sensor 10. A laboratory version of such a $CO_2$ sensor is sold by Aritron as 7MB-1930-8D3. A conventional VOC circuit 27 is used to detect the presence of VOCs in the zone. A microcontroller 28 provides the interface circuitry to connect to all of the previously described functional components and provide an environment for the software. Software resides in an EPROM that is external to the microcontroller 28 package. Alternative apparatus for sensing $CO_2$ are also contemplated such as, for example, the non-dispersive infrared (NDIR) approach discussed in U.S. Pat. Nos. 4,694,173; 5,026,992 and 5,060,508, all to Wong and all hereby incorporated by reference.

Figure 2:
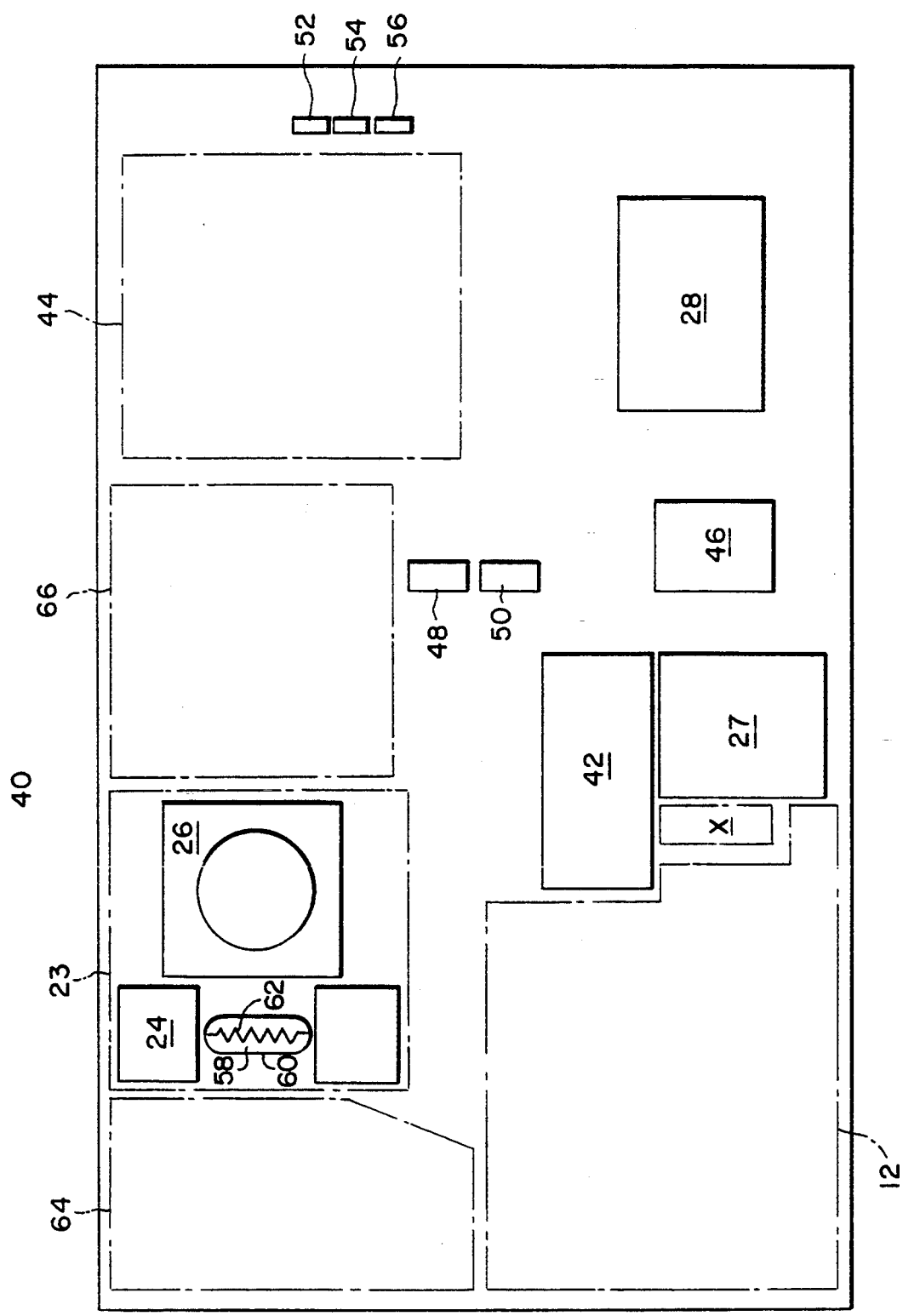
FIG. 2 is a top elevational view of a printed circuit board on which are mounted the electronic components of the present invention.

The functional components of the present invention that are depicted in FIG. 1 are shown laid out on the printed circuit board shown generally at 40 in FIG. 2. Terminal block connections 42 are provided for a 24 VAC power connection to power supply 12 that is grouped within the dashed lines indicated by the numeral 12 at the lower left portion of FIG. 2. Class 2 power is used to minimize any Underwriter Laboratories (UL) requirements. No ON/OFF switch is provided so that the $CO_2$/IAQ sensor 10 is hard wired to the controller of the ventilation system and is powered at all times that the ventilation system is powered.

A terminal block connection 42 is also provided for the $CO_2$ output terminal 14. The output is a 0-10 volts direct current (VDC) analog signal representing the measured $CO_2$ level. The value ranges from 0 to 2000 PPM where 0 VDC indicates 0 PPM and 10 VDC represents 2000 PPM of $CO_2$ in the zone which the $CO_2$/IAQ sensor 10 is monitoring.

A terminal block connection 42 is also provided for the IAQ output terminal 16. The IAQ analog value is calculated by combining the measured $CO_2$ value provided by the measurement cell and signal conditioning unit 26 with a value associated with measured VOC value provided by the VOC circuit 27. The IAQ value ranges from 0 to 2000 and is a "unitless" value. The 0-10 VDC outputs described above are generated within the output circuitry 44, depicted within the dashed lines in the upper right of the printed circuit board 40.

The calibration port 18 is used only during factory calibration of the $CO_2$/IAQ sensor 10 and accordingly, is setup for quick connects only. No terminal blocks or transient protection are provided. The calibration port quick connects are designated by X on printed circuit board 40. Special software resident in the CO$_2$/IAQ sensor 10 and in a dedicated calibration fixture (not shown) is required to load the necessary information into the CO$_2$/IAQ sensor 10. Once the calibration information is loaded, the calibration information is preserved in non-volatile memory within the EPROM 46 of CO$_2$/IAQ sensor 10.

The two analog outputs of the CO$_2$ output terminal 14 and the IAQ output terminal 16 respectively described above can also be used as binary ON/OFF outputs. Utilizing the output method select 22 and selecting the desired binary output method via the appropriate jumpers 48, 50, the operator may select outputs having a signal level of 0 VDC representing the OFF condition and 10 VDC representing the ON condition. The jumpers 48, 50 provide the capability to select between analog output or binary output operation and designate the binary output trigger levels for IAQ. The CO$_2$/IAQ sensor 10 is preconfigured during construction with both jumpers installed. A jumper 48, 50 is considered to be in the off condition when such jumper 48, 50 is installed in printed circuit board 40 and is considered to be in the on condition when such jumper 48, 50 is not installed in printed circuit board 40. FIG. 3 summarizes the use of the two jumpers 48, 50:

where: J1 is the first jumper, and J2 is the second jumper.

Returning to FIG. 2, sensor status indicators in the form of LEDs 52, 54, and 56 are provided for visual indication of sensor operation and the calculated IAQ value. The LEDs 52, 54, and 56 are mounted on the printed circuit board 40 of the CO$_2$/IAQ sensor 10. No dedicated openings are made in the cover of the CO$_2$/IAQ sensor 10 to make the LEDs 52, 54, and 56 externally visible. Instead, the LEDs 52, 54, and 56 are viewed through the air flow slots in the cover of the CO$_2$/IAQ sensor 10. Only one LED will be ON at any given time. In the preferred embodiment, LEDs 52, 54, and 56 have the designations indicated in Table 1:

TABLE 1

| | |
|---|---|
| All LEDs 52, 54, and 56 = OFF, | The CO$_2$/IAQ sensor 10 is operating abnormally or no power has been applied. |
| GREEN LED 56 = ON, | The CO$_2$/IAQ sensor 10 is operating normally and the IAQ value is less than 800. |
| YELLOW LED 54 = ON, | The CO$_2$/IAQ sensor 10 is operating normally and the IAQ value is greater than or equal to 800 and less than 1000. |
| RED LED 52 = ON, | The CO$_2$/IAQ sensor 10 is operating normally and the IAQ value is greater than or equal to 1000. |

The CO$_2$ sensor 23 consists of in part of the infrared light source 24, which is pulsed on and off under micro software control by the microcontroller 28. The infrared light source 24 has a light bulb 58, which has a clear glass evacuated tube 60, enclosing a filament 62.

The second part of the CO$_2$ sensor 23 is comprised of a sensing and signal conditioning cell 26. The sensing cell 26 comprises four parts, the machined aluminum block which provides the sample chamber as well as mounting for the other parts, an infrared filter, a membrane and a microphone. The infrared light source 24 provides a wide spectrum of light in soft pulses on a timed basis. As the pulse of light passes through the infrared filter, only a specific, narrow band of infrared light is allowed through. This spectra of infrared lights excites CO$_2$ specifically. The amount of light which is absorbed by the CO$_2$ sample is directly proportional to the concentration of CO$_2$ in the sample. As the excited CO$_2$ decays back to its normal energy state, the energy is converted to thermal energy, which heats the gas sample. As the gas sample is heated it tries to expand. Since it is contained in a tight chamber it cannot expand and therefore the pressure of the chamber increases. The microphone is a pressure transducer and it measures this thermal pressure increase as an electrical signal. The analog signal processor amplifies the signal and feeds it to the microprocessor for further processing. The membrane provided two functions, it allows ambient air to diffuse in and out of the cell, and it acts as a block to the thermal expansion of the heated gas. The sensing cell 26 is generally shown in U.S. Pat. Nos. 4,557,397; 4,657,397 and 4,740,086, all to Oehler et al. and all of which are hereby incorporated by reference.

The light source 24 and the cell 26 that comprise the CO$_2$ sensor 23 are physically small as compared to existing CO$_2$ sensor designs. This reduced size permits the CO$_2$/IAQ sensor 10 to be sized such that the CO$_2$/IAQ sensor 10 can be utilized in a zone wall mount device.

The CO$_2$ measurement is made directly by the CO$_2$ sensor 23. The method of measurement is by the photo acoustic method, which provides a low signal for low concentrations of CO$_2$ and a high signal for high concentrations of CO$_2$. While this would seem obvious, it is in contrast to certain existing CO$_2$ sensor designs. The infrared light source 24 is self adjusting as provided by the circuitry comprising the lamp intensity control 64, depicted within the dashed lines at the upper left corner of printed circuit board 40. The infrared light source 24 is optically monitored by the lamp intensity control 64 to take into account the aging effects of the bulb 58 of the infrared light source 24. This minimizes the effect that aging of the bulb 58 has on the accuracy and stability of the CO$_2$ sensor 23. Signal processing of the output of the CO$_2$ sensor 23 is provided by the analog signal processor 66.

The photo acoustic signal of the CO$_2$ sensor 23 is linear and has zero offset. This feature necessitates only a single point to calibrate the CO$_2$ sensor 23. Span (or slope) is the only parameter that requires calibration. The calibration is made with respect to a reference CO$_2$ value. Additionally, the cell 26 has proved to be very stable. It is not anticipated that field calibration of the CO$_2$ sensor 23 will be required for at least five years after installation.

The VOC circuit 27 is a known device that is commercially available. Several such devices are known that are functional equivalents. In the preferred embodiment, the VOC circuit 27 is made up of a heated element which is heated to a relatively high temperature on the order of 500° C. This heat causes the organic contaminants on the surface of the element to burn. The heated element is located proximate a semiconductor. The semiconductor may be formed in a tube surrounding the heated element. Electron transfer occurs between the organic compounds and the already absorbed oxygen molecules in the semiconductor surface. The burning, which results in the electron transfer causes a relatively large increase in the conductivity of the semiconductor for a relatively small change in the concentration of the organic compounds. This change occurs within a few seconds and is completely reversible.

The VOC circuit 27 is general in that the organic contaminant that is burned is detected without reference to which organic substance is present. The VOC circuit 27 is also not specific in that the amount of organic contaminant that is present is not accurately measured. The VOC circuit 27 responds with varying degrees of sensitivity to a wide variety of volatile organs contaminants, including hydrogen, hydrocarbons, alcohols, carbon monoxide, benzene, and others. Effectively then, the VOC circuit 27 indicates that a volatile or gaseous organic contaminant is present of unknown composition and in an unspecified concentration. Not withstanding the limitations of the detection, the information that is provided is valuable when combined with the output of the $CO_2$ sensor 23 to provide an indication of the indoor air quality.

The heart of the $CO_2$/IAQ sensor 10 is the microcontroller 28. The microcontroller 28 is a micro processor in the 8-bit family and includes on board analog to digital (A/D) conversion and random access memory (RAM). The microcontroller 28 has the necessary input and output (I/O) pins to interface to the various sensor circuits 23, 27, configuration jumpers 48, 50, and analog outputs 14, 16.

In operation, a leading indicator of contamination is selected. In the preferred embodiment, the leading indicator is selected to be the level of concentration of $CO_2$ in the zone. The level of concentration of $CO_2$ is a good choice as the leading indicator because it is both selective and specific. It is selective in that only the level of concentration of $CO_2$ is measured without regard to any other contaminants that may be present. It is specific in that the level of contamination is relatively accurately determined in parts per million (PPM). It is understood that other indicators, such as VOCs, temperature or relative humidity, could be selected as the leading indicator.

The leading indicator is influenced by the sensing of one or more additional indicators of air quality. In the preferred embodiment, the leading indicator, $CO_2$, is influenced by the detection of VOCs. The leading indicator could also be influenced by other indicators, such as temperature and relative humidity and the like. The leading indicator, $CO_2$, may also be influenced by two or more secondary indicators, such as VOC's and smoke. In the preferred embodiment, both of the secondary indicators are each added to the primary indicator using one of the subsequently described methods. However, other ways of modifying the primary or leading indicator are also contemplated, including selecting the larger of the secondary indicators for use in modifying leading indicator.

As previously noted, the leading indicator of $CO_2$ is also a good choice for greenhouse, tunnel, fruit storage and pig farm applications since it is both selective and specific. Because it is specific, different threshold values for $CO_2$ can be identified for initiating increased ventilation for these operations. Other secondary indicators such as CO, hydrocarbons, ammonia, ethylene, etc. can be used to influence the leading indicator using similar methods but with different values.

In practice, an acceptable level of contamination is selected. For example, a level of 1000 carbon dioxide equivalence units is selected as the level above which increased ventilation of the zone is called for. In the case of $CO_2$ contamination only, a level of 1000 equates to a level of 1000 PPM of contamination of $CO_2$. Such a level is sensed by the $CO_2$ sensor 23. As the level of 1000 PPM of contamination of $CO_2$ is exceeded, the HVAC system is commanded to increase the ventilation of the zone.

In the case where there is a relatively elevated concentration of $CO_2$ in the zone of, for example, 800 PPM, no increased ventilation is commanded since the concentration does not exceed the level of 1000 carbon dioxide equivalence units selected above. Given this level of $CO_2$ contamination, it may be desirable to increase the ventilation in the zone if there is additionally the presence of other contaminants in the zone. By integrating the output of the $CO_2$ sensor 23 and the VOC circuit 27, the microcontroller 28 develops an influencing factor that is applied to the leading indicator ($CO_2$ in the preferred embodiment) to generate an output signal. As previously indicated, the output of the VOC circuit 27 is both general and non-selective. Accordingly, such output cannot be considered to be measured in PPM or any other recognized units of measurement. The microcontroller 28 generates a nondimensional influencing factor and adds it to the output of the $CO_2$ sensor 23. By adding a nondimensional factor to a dimensional measurement, the dimensional measurement is converted to a nondimensional number such as the $CO_2$ $_{eq}$ units of the invention's preferred embodiment. In the present example, if the microcontroller 28 generates a factor of 300, representing the VOC contamination level, and adds it to the measured 800 PPM of $CO_2$ contamination, the resulting contamination level is 1100. A contamination level of 1100 is enough to trigger an increased level of ventilation in the zone. In this manner the leading indicator is influenced by another indicator to arrive at a level that warrants ventilation in the zone as a result of contamination by both the leading indicator and the other indicator. If two secondary modifiers (such as a VOC signal and a CO signal) are implemented, their signals preferably are cumulative, but could be combined in several other ways such as by averaging or by selecting the signal of greater magnitude.

The microcontroller 28 may convert the output of the VOC circuit 27 to an influencing factor in a number of ways. A way is to look up a constant in a table that corresponds to a specified output of the VOC circuit 27. An example of such a table is as follows:

Table Lookup Method

The inputs are measured $CO_2$ value ($CO_2$_Val) in PPM units and the measured VOC value (VOC_Val) in percentage of concentration. The output is a VOC compensated value (IAQ_Out).

1. Determine which of the three ranges in which $CO_2$_Val falls:
   Low = 0–600 PPM
   Med = 600–1200 PPM
   High = 1200–1800 PPM 2. Determine which of the four ranges in which VOC_Val falls:
   None = 0–10%
   Low = 10–40%
   Med = 40–70%
   High = 70–100%

3. Find the table entry corresponding to the identified $CO_2$ and VOC ranges:

|     |      | $CO_2$ Value | | |
| --- | --- | --- | --- | --- |
|     |      | Low | Med | High |
| VOC | None | 0 | 0 | 0 |
| Value | Low | 100 | 100 | 100 |
|     | Med | 200 | 200 | 300 |
|     | High | 200 | 300 | 400 |

4. Add the value of the table entry to the $CO_2$ value yielding the IAQ output value in $CO_{2\ eq}$ units:

$$CO_2\_Val + Table\ Entry = IAQ\_Out$$

The factor that relates to the VOC concentration is determined in step 3. To develop the table presented in step 3, the $CO_2$/IAQ sensor 10 must have first sensed the levels of $CO_2$ and VOC concentration as provided for in steps 1 and 2. Using the VOC level, the table is entered as for example, a medium level of $CO_2$ combined with a medium level of VOC results in an influencing factor of 200 dimensionless units. In step 4, the influencing factor is added to the sensed level of $CO_2$. In the present example, given a level of $CO_2$ of 900 (which falls within the medium range of but is less than the level of 1000 PPM of $CO_2$ necessary to trigger an increased amount of ventilation), the IAQ output is the sum of the 900 and the influencing factor of 200 to yield an output of 1100. This level is enough to command an increase in the level of ventilation to the zone. Alternatively, the factor may be influenced by maintaining a trend of the output of the VOC circuit 27 and increasing the factor amount responsive to a trend that shows the level of the second indicator increasing dramatically.

Figure 4:
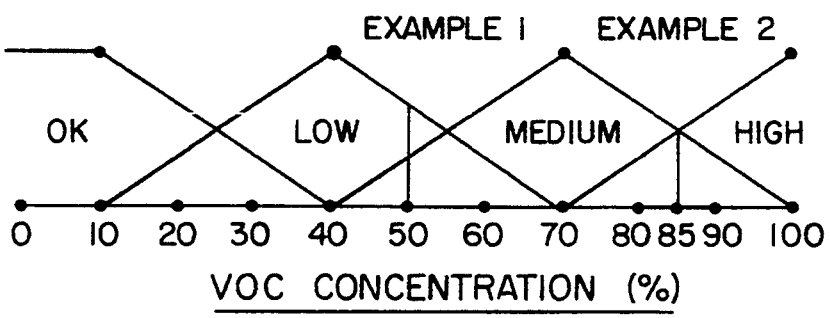
FIG. 4 is a graph depicting the membership functions utilized by fuzzy logic to provide an IAQ output signal in accordance with an alternative embodiment.
Figure 4:
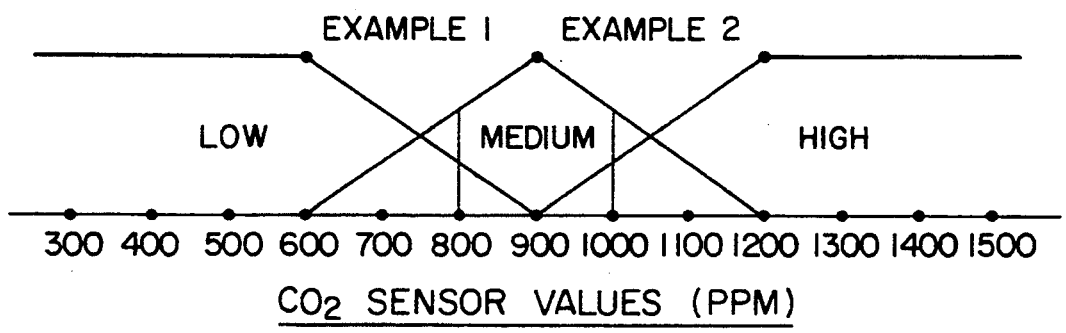

A third way to arrive at a IAQ level is by the application of fuzzy logic to the output of the VOC circuit 27 and the $CO_2$ sensor 23. This results in a somewhat transitional change in the factor, as distinct from a stepped change in the factor that is applied to the output of the $CO_2$ sensor 23 and is presented in FIG. 4. The membership functions necessary to the fuzzy logic method of arriving at a IAQ output are depicted in FIG. 4. The fuzzy logic method is described as follows:

Fuzzy Logic Method

The inputs are measured $CO_2$ value ($CO_2\_Val$) in PPM units and the measured VOC value (VOC_Val) in percentage of concentration. The output is a VOC compensated value (IAQ_Out). The logic as defined in pseudo code is as follows:

1. Define the membership function based on the inputs:

```
(a) "Fuzzify CO2_Val"
    CLow = MAX (0,(900-CO2_Val)/300)
    CHigh = MAX (0,(CO2_Val-900)/300)
    IF CO2_Val < 900 THEN CMed = MAX (0,(CO2_Val-600)/300)
            ELSE CMed = MAX (0,(1200-CO2_Val)/300)
    END IF
(b) "Fuzzify VOC_Val"
    VOK = MAX (0,40-VOC_Val)/30)
    VHigh = MAX (0,(VOC_Val-70)/30)
    IF VOC_Val > 70   THEN
        VMed = MAX (0,(100-VOC_Val)/30) and
        VLow = 0
            ELSE IF VOC_Val > 40
                THEN VMED = MAX
                (0,(VOC_Val-40)30) and VLow = MAX
                (0,(70-VOC_Val)/30)
```
```
            ELSE VMed = 0 and VLow =
                MAX (0,(VOC_Val-10)/30)
    END IF
END IF
```

2. Apply the rules:
Comp1 = MAX (MIN (CLow, VLow), MIN (CMed,VLow), MIN (CHigh,VLow))
Comp2 = MAX (MIN (CLow, VMed), MIN (CMed,VMed), MIN (CLow, VHigh) )
Comp3 = MAX (MIN (CHigh,VMed), MIN (CMed,VHigh))
Comp4 = MIN (CHigh,VHigh)

3. Defuzzification:

$$VOC\_Comp = ((Comp1*100) + (Comp2*200) + (Comp3*300) + (Comp4*400))$$

4. Apply the VOC compensation value to the $CO_2$ Value yielding the output:

$$IAQ\_Out = CO_2\_Val + VOC\_Comp$$

Examples of the Fuzzy Logic Method are as follows:

EXAMPLE 1

In this first example of the Fuzzy Logic embodiment, the VOC concentration is shown in FIG. 4 as 50% and overlapping both the low and medium ranges. The $CO_2$ sensed value is 800 part per million (PPM) and overlaps both the low and medium ranges with an emphasis on the medium range. Applying the Fuzzy Logic Method defined above, the membership functions are defined first.

CLow is determined to be (900-800) divided by 300 which equals one-third.

CHigh is determined to be zero since zero is greater than minus one-third.

Since the $CO_2$ value of 800 is less than 900, CMed is determined to be two-thirds.

Similarly, VOK is determined to be zero since zero is greater than minus one-third.

VHigh is determined to be zero since zero is greater than minus two-thirds.

Since the VOC concentration percentage is greater than forty, VMed is determined to be one-third and VLow is determined to be two-thirds.

Applying the rules per Step 2 of the Fuzzy Logic Method, Comp1 is determined to be two-thirds since that value is the maximum of one-third, two-thirds and zero. Comp2 is determined to be one-third since that value is the maximum of one-third, one-third and zero. Comp 3 is determined to be the zero and Comp 4 is determined to be zero.

Applying the Defuzzification Step 3 of the Fuzzy Logic Method, the VOC compensation signal (VOC_Comp) is determined to be 67+67+0+0 = 134.

Finally, in Step 4 of the Fuzzy Logic Method, the IAQ_out signal is determined to be the $CO_2$ sensed value of 800 PPM plus the VOC compensation value of 134. Thus the IAQ output signal is 934. This makes sense since a low to medium VOC concentration should have a meaningful but not a great effect on the reported indoor air quality.

EXAMPLE 2

Example 2 is a more extreme example of the Fuzzy Logic embodiment where the VOC concentration percentage is about 85%, falling midway between the medium and high ranges. Additionally, the $CO_2$ sensed value is a thousand parts per million overlapping both the medium and high ranges with an emphasis on the medium. One would expect a greater compensation value for the VOC concentration to be applied when determining the IAQ output signal.

Defining the membership function as per the Fuzzy Logic Method Step 1 above, CLow is determined to be zero, CHigh is determined to be one-third, and CMedium is determined to be two-thirds.

Similarly, VOK is determined to be zero, VHigh is determined to be one-half, VMedium is determined to be one-half and VLow is determined to be zero since the VOC value is greater than 70.

Applying the rules per Step 2 of the Fuzzy Logic Method, Comp1 is determined to be zero since its minimum comparisons all have a zero input. However, Comp2 is determined to be one-half since the minimum of CMed and VMed is one-half. Comp3 is determined to be one-half since the minimum of CHigh and VMed is one-third and the minimum of CMed and VHigh is one-half, the maximum value of one-half being selected for Comp3. Finally, Comp4 is determined to be one-third since it is the minimum of CHigh's one-third value and VHigh's one-half value.

Now applying the Defuzzification Step 3 of the Fuzzy Logic Method, the VOC compensation signal is determined to be 384 since Comp1 provides a value of zero multiplied by 100, Comp2 provides a value of 100 when multiplied by 200, Comp3 provides a value of 150 when multiplied by 300, and Comp4 provides a value of 134 when multiplied by 400.

When the VOC compensation value is added to the $CO_2$ value per Step 4 of the Fuzzy Logic Method, the IAQ output signal is determined to be 1384. Such a signal would cause an air conditioning system to take fairly drastic steps such as opening its outside air dampers to the maximum to bring in large quantities of fresh air and sounding an alarm so that building personnel could take precautions and investigate the source of the problem.

Greenhouse Example

In a non-commercial office building application such as a greenhouse air quality control, the exhaust fans could be configured to come on at different air quality levels. For example if the air quality level exceeded 2000 PPM, the first exhaust fan could be turned on and a warning light activated. If the air quality level exceeded 2500 PPM, the second exhaust fan could be turned on and an audible alarm sounded. If only $CO_2$ was being sensed, the levels of $CO_2$ by itself may not exceed these values. However, when combined with a secondary value such as CO or hydrocarbons, the cumulative effect would be a more reasonable representation of air quality and could reach the appropriate levels for turning on one or more exhaust fans.

Figure 5:
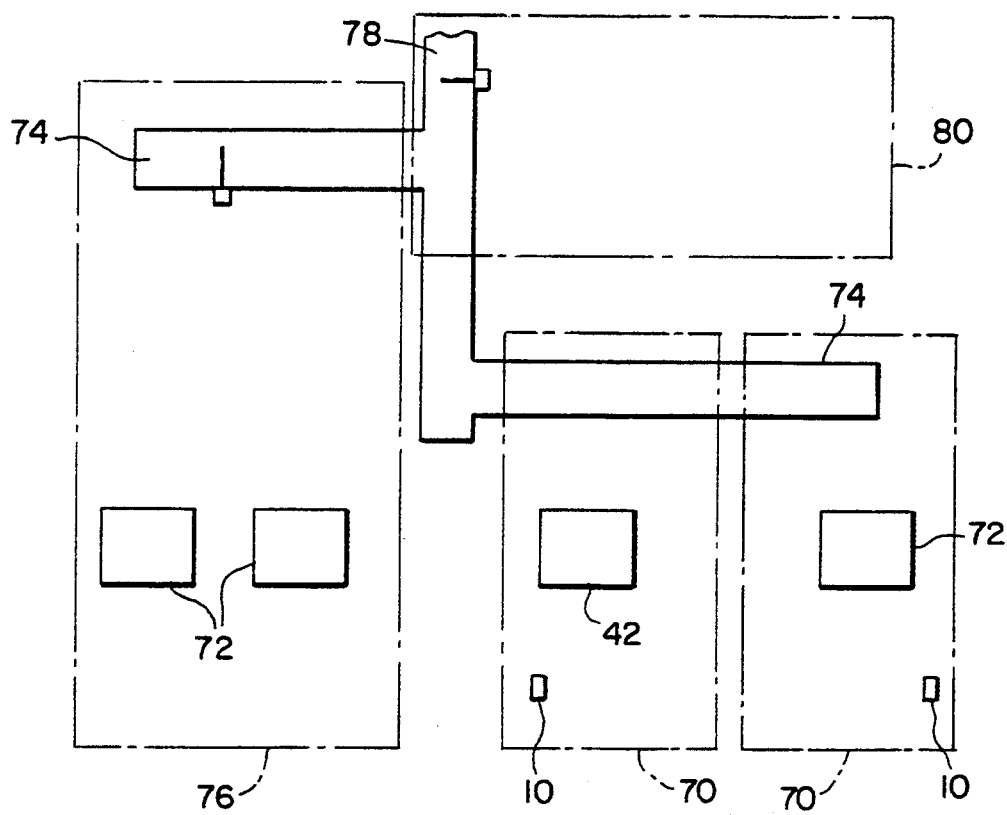
FIG. 5 is a functional block diagram showing the present invention employed in a variety of locations to control the indoor air quality of a building.

FIG. 5 illustrates the possible $CO_2$/IAQ sensor 10 locations which might be used in a building application to monitor indoor air quality and to control the ventilation rate for the specific zones. Placement of the sensor becomes a function of what IAQ zone is of interest to be monitored and controlled. For example, it is possible to mount a wall version of the $CO_2$/IAQ sensor 10 in small discrete zones that are potential problem areas like laboratories, lunch rooms, conference rooms, and the like. Such discrete zones are depicted in FIG. 5 at 70. In operation, when the $CO_2$/IAQ sensor 10 senses a contamination condition that calls for increased ventilation, a signal is sent to the HVAC system 72 to increase the amount of ventilation in zone 70. Responsive thereto, the HVAC system 72 increases the amount of ambient outside air that is being provided to zone 70 in order to dissipate the sensed contamination. As the amount of ambient air is increased, the return air duct 74 draws the contaminated air in the zone 70 out of the zone 70. Depending on the temperature and humidity conditions of the outside ambient air, the HVAC system 72 may require the expenditure of additional energy to heat or cool the zone 70 during periods of increased ventilation required to dissipate the contamination. When the sensed contamination level in zone 70 decreases to an acceptable level, the $CO_2$/IAQ sensor 10 provides such a signal to the HVAC system 72 and the HVAC system 72 reduces the amount of ambient air that is being supplied to the zone 70.

By using the duct mount version of the $CO_2$/IAQ sensor 10, it is possible to monitor large zones economically. FIG. 5 depicts a large zone at 76. The $CO_2$/IAQ sensor 10 is depicted with a probe extending mounted into one leg of the return air duct 74 for the larger zone 76. Since there is a continual flow of return air in return air duct 74 while the HVAC system 72 is in operation heating or cooling zone 76 as required, the contaminants in the zone 76 are exhausted past the $CO_2$/IAQ sensor 10. Operation is essentially as described above.

Lastly, by placing the $CO_2$/IAQ sensor 10 in the main return air duct 78 it is possible to combine many areas into an IAQ combined zone 80. The main return air duct 48 is connected directly to the heating or cooling units for the building. Accordingly, by placing the $CO_2$/IAQ sensor 10 in the main return air duct 78, the contaminant level that is representative of the entire zone 80 is capable of being sensed and corrected by increasing the ventilation to the entire zone 80. However, the larger the zone being monitored via the return air duct, the greater chances that mixing of return air will cancel out the indication of poor IAQ in small portion of the zone. This remains as an application issue on a building by building basis. This flexibility in the $CO_2$/IAQ sensor 10 gives building operators the ability to determine what IAQ zones are needed in the building and how the IAQ zones will be monitored and controlled.

Regardless of the size of the zone, it is possible to define the minimum ventilation (outside air) flow required for each zone at design occupancy. This value will define the supply air "richness" needed for each zone. The IAQ sensor value can be used to reset this minimum ventilation flow and, if necessary, the setpoint at the air handler.

The present invention has now been described with reference to several embodiments thereof. The invention senses the quality of indoor air in a building where a specific and quantifiable leading indicator of indoor air quality is modified by a secondary indicator of indoor air quality. It will be apparent to those skilled in the art that many changes and modifications can be made in the embodiments described without departing from the scope of the invention. Such modifications clearly include the use of any one of a large variety of known sensors, particularly to provide the modifying signal. The use of this variety of modifying signals widens the application of the IAQ sensor to all areas inhabited by flora or fauna. Other modifications contemplate a leading indicator and an internal secondary indicator arranged in a common housing with an external secondary indicator providing for either cumulative or substitutional modification of the leading indicator. Thus, the scope of the present invention should not be limited to the structures described herein, but rather by the structures described by the language of the claims, and the equivalents of those structures.

We claim:

1. An indoor air quality sensor designed to be utilized in a zone of a building to control the ventilation of the zone, comprising:
   a primary sensor means for sensing a selected leading indicator of contamination in the zone and providing an output signal representative thereof;
   at least a first additional sensor means for sensing at least a first selected secondary indicator of contamination in the zone and providing an output signal representative thereof; and
   processor means for generating an output signal representative of the indoor air quality in the zone, receiving the output signals from the primary sensor means and the first additional sensor means and generating the output signal representative of the indoor air quality in the zone by influencing the output of the primary sensor means by an amount that is a function of the output signal of the first additional sensor means.

2. An indoor air quality sensor as claimed in claim 1 wherein the primary sensor means is a carbon dioxide sensor.

3. An indoor air quality sensor as claimed in claim 2 wherein the first additional sensor means is at least one sensor selected from the group comprising a volatile organic compound sensor, a carbon monoxide sensor, a temperature sensor, an ammonia sensor, an ethylene sensor and a relative humidity sensor.

4. An indoor air quality sensor as claimed in claim 3 further including a second additional sensor means for sensing a second selected secondary indicator of contamination in the zone and providing an output signal representative thereof to the processor means, the processor means modifying the output signal as a function of the signal from the second sensor means.

5. An indoor air quality sensor as claimed in claim 4 wherein the first and second additional sensors sense distinct contaminants and cumulatively influence the output of the primary sensor.

6. An indoor air quality sensor as claimed in claim 4 wherein the output signals of the first and second additional sensors are compared and the larger signal is selected to influence the output of the primary sensor.

7. An indoor air quality sensor as claimed in claim 4 wherein the second additional sensor is physically removed from the first additional sensor.

8. An indoor air quality sensor as claimed in claim 1 wherein the processor means further includes fuzzy logic means for generating said output signal.

9. A method of sensing indoor air quality in a zone of a building in order to control the ventilation of the zone, comprising the steps of:
   sensing a selected leading indicator of contamination in the zone and providing a first output signal representative thereof;
   sensing at least one selected secondary indicator of contamination in the zone and providing an output signal representative thereof; and
   generating an output signal representative of the indoor air quality in the zone by influencing the first output signal by an amount that is a function of the output signal of the least one additional sensor means.

10. The method of sensing indoor air quality in a zone of a building as claimed in claim 9 wherein the leading indicator is specific and quantifiable and the secondary indicator is modified to the context of the leading indicator.

11. The method of sensing indoor air quality in a zone of a building as claimed in claim 10 wherein the leading indicator of contamination in the zone is the concentration of carbon dioxide therein.

12. The method of sensing indoor air quality in a zone of a building as claimed in claim 9 wherein the amount that the leading indicator of contamination is influenced is derived by applying fuzzy logic to the output signal of the primary indicator and the selected secondary indicator or indicators to generate a nondimensional modifier that is added to the first output signal yielding a dimensionless value.

13. The method of sensing indoor air quality in a zone of a building as claimed in claim 12 wherein the dimensionless value provides a measure of carbon dioxide equivalence.

14. An indoor air quality sensor designed to be utilized in a zone of a building to control the ventilation of the zone, comprising:
   carbon dioxide sensor means for sensing the carbon dioxide concentration level in the zone, the carbon dioxide concentration level being a selected leading indicator of contamination in the zone and providing an output signal representative thereof;
   volatile organic compound sensor means for sensing at least one volatile organic compound in the zone, the sensed volatile organic compound being a selected secondary indicator of contamination in the zone and providing an output signal representative thereof; and
   processor means for generating an output signal representative of the indoor air quality in the zone, receiving the output signals from the carbon dioxide sensor means and the volatile organic compound sensor means and generating the output signal representative of the indoor air quality in the zone by influencing the output of the carbon dioxide sensor by an amount that is a function of the output signal of the volatile organic compound sensor means.

15. An indoor air quality sensor as claimed in claim 14 wherein the carbon dioxide sensor means comprises a photo acoustic device.

16. An indoor air quality sensor as claimed in claim 14 wherein the carbon dioxide sensor means comprises:
   light source means for generating a source of light energy; and
   cell means for measuring the carbon dioxide particle concentration in the zone, having structure defining a chamber, the chamber defined in part by a membrane allowing for entry of air from the zone into the chamber, a filter directly opposite the infrared light source means to allow the necessary light energy that has been generated by the infrared light source means to enter the chamber, a sensitive microphone to measure the carbon dioxide particle concentration in the air from the zone and a means of pulsing or modulating the right source.

17. An indoor air quality sensor as claimed in claim 16 wherein the light source is an infrared light source.

18. An indoor air quality sensor as claimed in claim 16 wherein the light source is a non-dispersive infrared (NDIR) light source.

19. A control system designed to control the fresh air input to a ventilated zone having sensing means for sensing a principal contaminant and at least one auxiliary contaminant in the zone and generating signals related to the levels of concentration of such contaminants, and microprocessor means for generating an output signal representative of the air quality in the zone, communicatively coupled to said sensing means and receiving the signals related to the levels of concentration of such contaminants therefrom, and correcting the signal related to the principal contaminant with the signal representative of at least one auxiliary contaminant, the corrected signal being related to the air quality in the zone and utilized to control the fresh air input to the ventilated zone.

20. A control system as claimed in claim 19 wherein the sensing means for sensing a principal contaminant is a carbon dioxide sensor.

21. A control system as claimed in claim 19 wherein the sensing means for sensing the at least one auxiliary contaminant senses an oxidizable component of the air in the zone.

22. A method of controlling the fresh air input to a ventilated zone comprising the steps of:
sensing a principal contaminant in the air of the zone and generating a signal related to the levels of concentration of such principal contaminant;
sensing at least one auxiliary contaminant in the zone and generating a signal related to the level of concentration of such auxiliary contaminant;
generating an output signal representative of the air quality in the zone by correcting the signal related to the principal contaminant with the signal representative of at least one auxiliary contaminant, the corrected signal being related to the air quality in the zone and utilized to control the fresh air input to the ventilated zone.

23. A method of control as claimed in claim 22 wherein the principal contaminant in the air of the zone is carbon dioxide.

24. A method of control as claimed in claim 22 wherein the auxiliary contaminant in the zone is an oxidizable component of the air in the zone.

25. A method of determining indoor air quality comprising the steps of:
measuring indoor air for the presence of a first specific contaminant;
measuring indoor air for the presence of a second contaminant;
applying a compensation signal to the first measurement where the compensation signal is a function of the second measurement; and
generating and disseminating an indoor air quality output signal representative of the compensated signal.

26. The method of claim 25 including the further step of controlling an HVAC system in response to the disseminated indoor air quality signal.

27. The method of claim 26 wherein the first contaminant sensor is a carbon dioxide sensor and the second contaminant sensor is selected from the group of a volatile organic compounds sensor, a carbon monoxide sensor, a temperature sensor, a humidity sensor, a smoke sensor or a cleaning agent sensor.

28. The method of claim 27 wherein the compensation step includes the use of a look up table.

29. The method of claim 27 wherein the compensation signal is determined using fuzzy logic.

30. The method of claim 29 wherein the first measured signal determines the presence of $CO_2$, the second measured signal determines the presence of volatile organic compounds, and wherein the membership function is determined by the $CO_2$ and volatile organic compound levels.

* * * * *